US012652225B2

(12) United States Patent
Karampatsis et al.

(10) Patent No.: US 12,652,225 B2
(45) Date of Patent: Jun. 9, 2026

(54) REQUESTING DATA FROM AN OAM

(71) Applicant: Lenovo (Singapore) Pte. Ltd., New Tech Park (SG)

(72) Inventors: Dimitrios Karampatsis, Ruislip (GB); Ishan Vaishnavi, Munich (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 356 days.

(21) Appl. No.: 18/546,952

(22) PCT Filed: Feb. 17, 2022

(86) PCT No.: PCT/IB2022/051437
§ 371 (c)(1),
(2) Date: Aug. 17, 2023

(87) PCT Pub. No.: WO2022/175874
PCT Pub. Date: Aug. 25, 2022

(65) Prior Publication Data
US 2024/0129209 A1 Apr. 18, 2024

Related U.S. Application Data

(60) Provisional application No. 63/150,508, filed on Feb. 17, 2021.

(51) Int. Cl.
*H04L 43/04* (2022.01)
*H04W 24/08* (2009.01)

(52) U.S. Cl.
CPC ............. *H04L 43/04* (2013.01); *H04W 24/08* (2013.01)

(58) Field of Classification Search
CPC ........ H04W 24/08; H04W 24/04; H04L 43/04
See application file for complete search history.

(56) References Cited

U.S. PATENT DOCUMENTS 12,160,771 B2 * 12/2024 Marquezan ........... H04W 24/08
12,185,229 B2 * 12/2024 Muñoz De La Torre Alonso .......
H04L 41/122

(Continued)

FOREIGN PATENT DOCUMENTS

CN 112134730 A 12/2020

OTHER PUBLICATIONS

PCT/IB2022/051437, "International Search Report and the Written Opinion of the International Searching Authority, or the Declaration", International Searching Authority, May 9, 2022, pp. 1-14.

(Continued)

*Primary Examiner* — Jason D Cardone
(74) *Attorney, Agent, or Firm* — Kunzler Needham Hilton

(57) ABSTRACT

Apparatuses, methods, and systems are disclosed for efficient data collection from an Operations, Administration and Management ("OAM"). One apparatus includes a processor and a transceiver that receives, from a first network function, a first request to provide data for at least one data type information. Here, the first request includes an indication that the data is to be available as historical data. The processor processes the data required according to the first request and sends a second request to a Data Repository Function ("DRF"). Here, the second request includes the data required and an indication that the data is to be available as historical data. The processor provides the data required to the first network function.

20 Claims, 9 Drawing Sheets

(56) References Cited

U.S. PATENT DOCUMENTS

| | | | | |
|---|---|---|---|---|
| 12,355,913 | B2 * | 7/2025 | Kalra | H04W 76/38 |
| 2020/0045753 | A1 * | 2/2020 | Dao | H04W 4/08 |
| 2021/0281468 | A1 * | 9/2021 | Al-Kanani | H04W 76/11 |
| 2021/0282003 | A1 * | 9/2021 | Li | H04W 76/25 |
| 2021/0306877 | A1 * | 9/2021 | Blake | H04W 24/04 |
| 2023/0148296 | A1 * | 5/2023 | Puente Pestaña | H04W 8/18 |
| | | | | 455/435.1 |
| 2023/0262170 | A1 * | 8/2023 | Kalra | H04L 12/1407 |
| | | | | 455/405 |
| 2023/0345297 | A1 * | 10/2023 | Karampatsis | H04L 41/342 |
| 2023/0388389 | A1 * | 11/2023 | Xin | H04L 67/51 |
| 2024/0163672 | A1 * | 5/2024 | Comak | H04L 9/3213 |

OTHER PUBLICATIONS

China Mobile, "KI #11 Evaluation updates on Data collection coordination aspect", SA WG2 Meeting #142E e-meeting S2-2008617, Nov. 16-20, 2020, pp. 1-5.

Ericsson et al., "KI#2—Solving ENs in 8.2 Conclusion on reselection of NWDAF plus some additions", SA WG2 Meeting #142E e-meeting S2-2009362, Nov. 16-20, 2020, pp. 1-3.

Nokia et al., "KI on Authorization of consumers for data access via DCCF", 3GPP TSG-SA3 Meeting #102-e S3-210116, Jan. 18-29, 2021, pp. 1-2.

3GPP, "3rd Generation Partnership Project; Technical Specification Group Services and System Aspects; Procedures for the 5G System (5GS); Stage 2 (Release 16)", 3GPP TS 23.502 V16.7.0, Dec. 2020, pp. 1-603.

3GPP, "3rd Generation Partnership Project; Technical Specification Group Services and System Aspects; Management and orchestration; Generic management services; (Release 16)", 3GPP TS 28.532 V16.6.0, Dec. 2020, pp. 1-232.

3GPP, "3rd Generation Partnership Project; Technical Specification Group Services and System Aspects; Management and orchestration; Performance assurance (Release 16)", 3GPP TS 28.550 V16.7.0, Dec. 2020, pp. 1-85.

* cited by examiner

Figure 2:
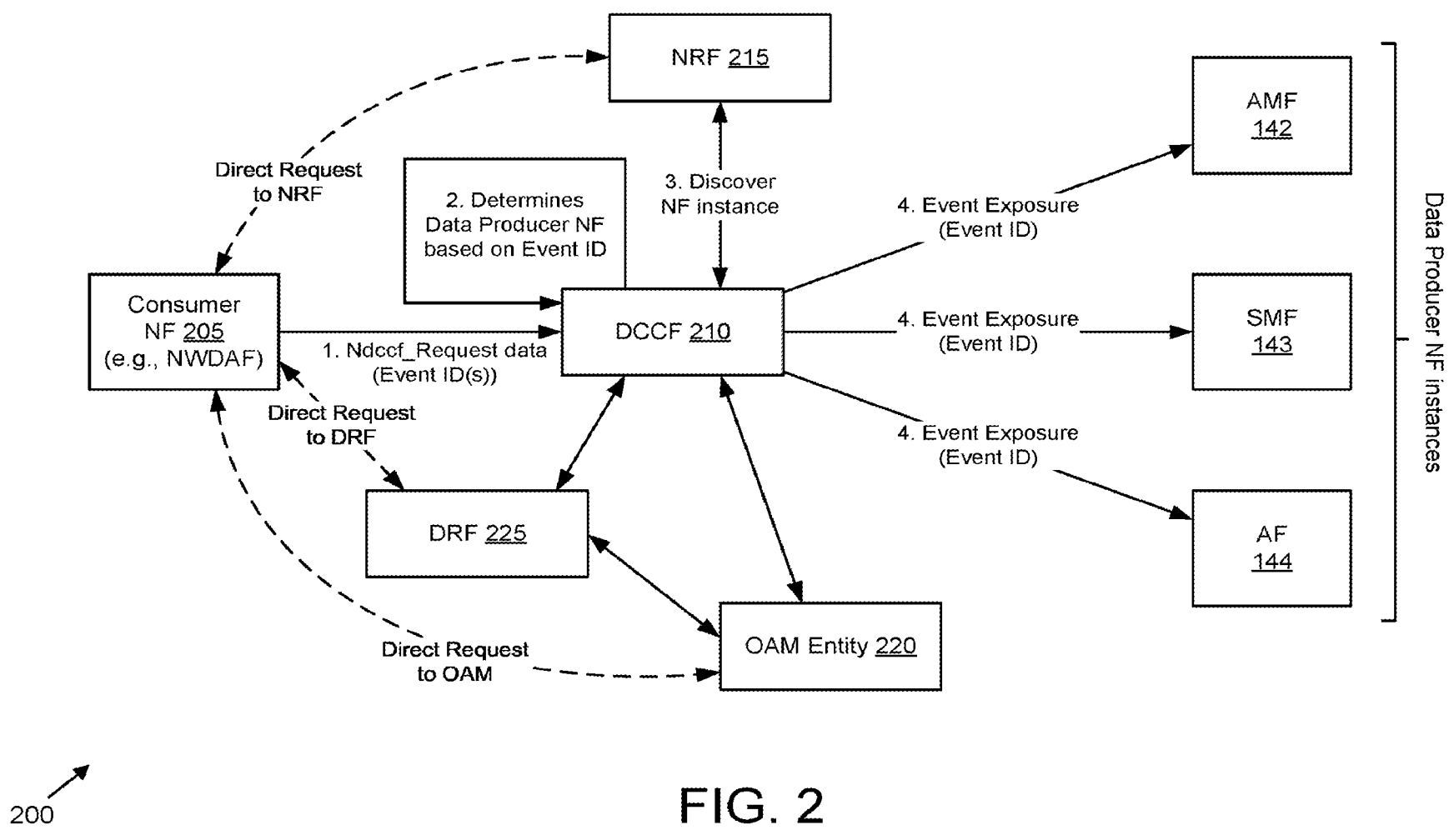

Data Producer NF instances

AMF
142

SMF
143

AF
144

4. Event Exposure
(Event ID)

4. Event Exposure
(Event ID)

4. Event Exposure
(Event ID)

NRF 215

3. Discover
NF instance

DCCF 210

OAM Entity 220

2. Determines
Data Producer NF
based on Event ID

DRF 225

1. Ndccf_Request data
(Event ID(s))

Direct Request
to DRF

Direct Request
to OAM

Direct Request
to NRF

Consumer
NF 205
(e.g., NWDAF)

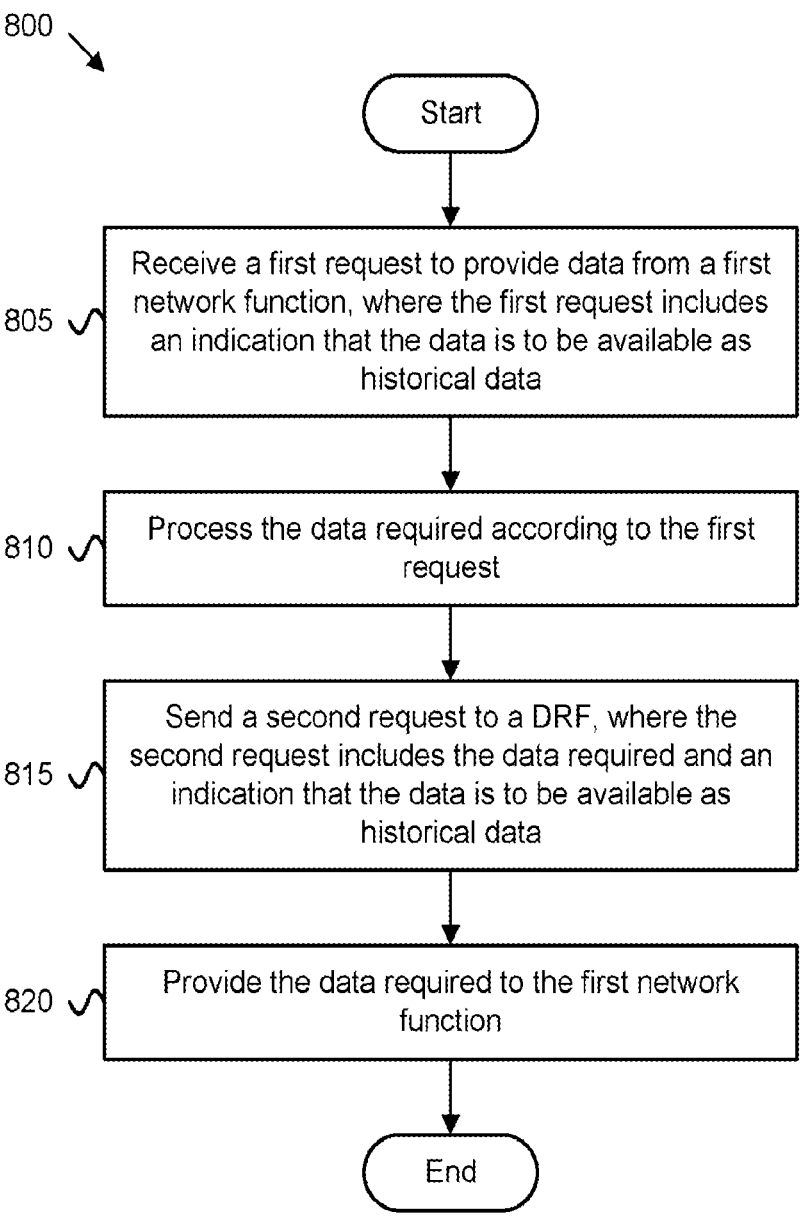

Start

805
Receive a first request to provide data from a first network function, where the first request includes an indication that the data is to be available as historical data 810
Process the data required according to the first request 815
Send a second request to a DRF, where the second request includes the data required and an indication that the data is to be available as historical data 820
Provide the data required to the first network function End

FIG. 8

REQUESTING DATA FROM AN OAM

CROSS-REFERENCE TO RELATED APPLICATIONS

This application claims priority to U.S. Provisional Patent Application No. 63/150,508 entitled "EFFICIENT DATA COLLECTION FROM AN OAM" and filed on Feb. 17, 2021 for Dimitrios Karampatsis and Ishan Vaishnavi, which application is incorporated herein by reference.

FIELD

The subject matter disclosed herein relates generally to wireless communications and more particularly relates to efficient data collection from an Operations, Administration and Maintenance ("OAM") system.

BACKGROUND

In certain wireless communication systems, a Data Collection Coordination Function ("DCCF") may be employed for Fifth-Generation ("5G") network analytics. The DCCF may coordinate collection of data from one or more Network Functions ("NFs") based on data collection requests from one or more Consumer NF(s).

BRIEF SUMMARY

Disclosed are procedures for efficient data collection from an OAM. Said procedures may be implemented by apparatus, systems, methods, or computer program products.

One method at data management device for handling a data collection request includes receiving a first request to provide data from a first network function, where the first request includes an indication that the data is to be available as historical data. The method includes processing the data required according to the first request. The method includes sending a second request to a Data Repository Function ("DRF"), where the second request includes the data required and an indication that the data is to be available as historical data. The method includes providing the data required to the first network function.

One method at a coordinating data collection entity for coordinating data collection at a network entity includes receiving a first request to provide data from a first network function, where the first request includes first information to identify the data requested. The method includes determining whether the data requested is available at a DRF, where the first information indicates that the data requested is to be retrieved from an Operation, Administration and Management ("OAM") platform. The method includes retrieving the data requested from the DRF when the data requested is available at the DRF and sending a second request to the OAM platform to retrieve the data when the data requested are not available at the DRF, where the second request includes a request for data based on the first information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2 is a diagram illustrating one embodiment of a procedure for data collection via the DCCF;

FIG. 8 is a flowchart diagram illustrating one embodiment of a first method for efficient data collection from an OAM.

DETAILED DESCRIPTION

Figure 1:
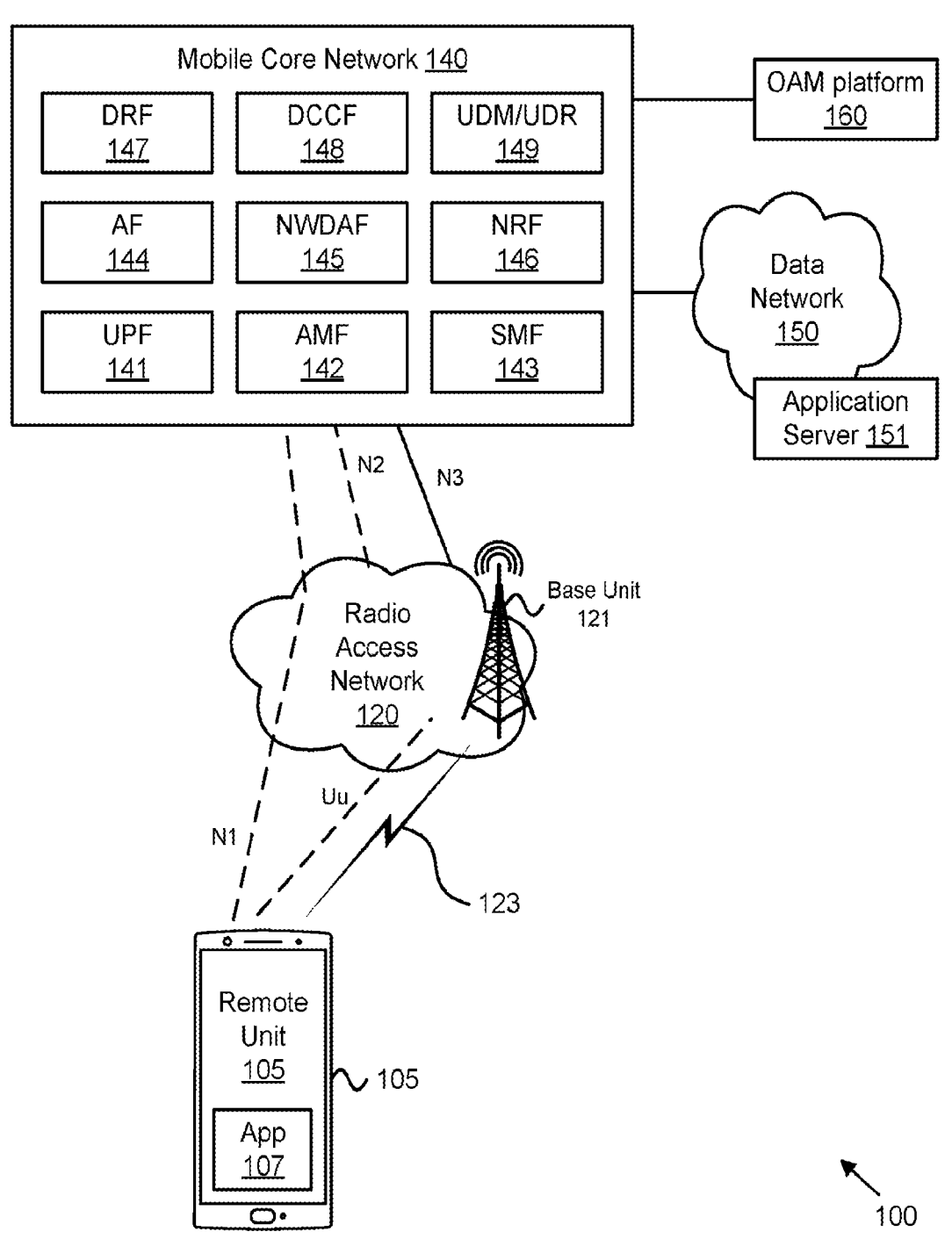
FIG. 1 is a schematic block diagram illustrating one embodiment of a wireless communication system for efficient data collection from an OAM.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for efficient data collection from an OAM. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

A Data Collection Coordination Function ("DCCF") is a new network function that coordinates collection of data from one or more NF(s) based on data collection requests from one or more Consumer NF(s). However, data collection from OAM requires specific services supported by OAM platforms where Event ID(s) are not supported. Hence, current network specifications do not support the DCCF to identify what data is required from an OAM platform based on a consumer request.

Described herein are solutions to resolve these issues with data collection. The below solutions detail how the Network Data Analytics Function ("NWDAF") requests data available at an OAM via the DCCF and how the DCCF determines what data is required by a consumer NF (e.g., an NWDAF) from an OAM.

According to a first solution, data collected from an OAM may be stored in a Data Repository Function ("DRF") in the Public Land Mobile Network ("PLMN"). In one embodiment of the first solution, when data collection request from consumer NFs are sent to OAM, the consumer NF may include in the request an indication that the data must be stored in a DRF in case a second consumer NF requires the same information. Such data is known as historical data. How the consumer NF decides that the data must be available as historical data is up to NF implementation. The OAM may also be configured by a network operator to store data at a DRF based on network operator expectation that such data will be required by multiple consumer NFs.

The OAM stores the data at a DRF and updates the Network Function Repository Function ("NRF") with information on the data stored at the DRF. The information includes data type (e.g., performance data file type, or performance data streaming), data type information (e.g., Reference Signal Received Power ("RSRP"), Reference Signal Received Quality ("RSRQ"), Channel Quality Indicator ("CQI"), downlink/uplink throughput, handover rate, etc.), the measurement period of the data and target of reporting (e.g., a specific User Equipment ("UE"), a specific group of UEs, or any UE) and Data Producer Type (i.e., information identifying the data producer, e.g., the OAM). When a second consumer NF requires the same data, the second consumer NF queries the NRF to identify whether there is a DRF that contains the required data. If a DRF is identified, then the second consumer NF requests the data directly from the DRF or via the DCCF.

According to another embodiment of the first solution, a Consumer NF that requires data from an OAM sends a request to collect the data to a DCCF, e.g., invoking an Ndccf service operation.

According to a second solution, data is collected to a DRF for OAM data via the DCCF. In one embodiment of the second solution, a consumer NF determines that data is required at an OAM. The consumer NF subscribes to an OAM to obtain the data required.

FIG. 1 depicts a wireless communication system 100 for efficient data collection from an OAM, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the Fifth-Generation ("5G") cellular system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, a remote unit 105 may be referred to as the User Equipment ("UE"), subscriber unit, mobile, mobile station, mobile device, user, terminal, user terminal, mobile terminal, fixed terminal, subscriber station, wireless transmit/receive unit ("WTRU"), a communication device, or by other terminology used in the art.

In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Furthermore, the UL communication signals may comprise one or more uplink channels, such as the Physical Uplink Control Channel ("PUCCH") and/or Physical Uplink Shared Channel ("PUSCH"), while the DL communication signals may comprise one or more downlink channels, such as the Physical Downlink Control Channel ("PDCCH") and/or Physical Downlink Shared Channel ("PDSCH"). Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the 5G-RAN. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a PDN Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, abase station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121.

Note that during NR operation on unlicensed spectrum (referred to as "NR-U"), the base unit 121 and the remote unit 105 communicate over unlicensed (i.e., shared) radio spectrum. Similarly, during LTE operation on unlicensed spectrum (referred to as "LTE-U"), the base unit 121 and the remote unit 105 also communicate over unlicensed (i.e., shared) radio spectrum.

In one embodiment, the mobile core network 140 is a 5G Core network ("5GC") or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO") and/or Public Land Mobile Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the 5G-RAN, a Session Management Function ("SMF") 143, an Application Function ("AF") 144, a Network Data Analytics Function ("NWDAF") 145, a Network Function Repository Function ("NRF") 146, a Data Repository Function ("DRF") 147, a Data Collection Coordination Function ("DCCF") 148, a Unified Data Management function ("UDM") and a User Data Repository ("UDR"). In some embodiments, the UDM is co-located with the UDR, depicted as combined entity "UDM/UDR" 149. Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network ("DN"), in the 5G architecture. The AMF 142 is responsible for termination of Non-Access Spectrum ("NAS") signaling, NAS ciphering and integrity protection, registration management, connection management, mobility management, access authentication and authorization, security context management. The SMF 143 is responsible for session management (i.e., session establishment, modification, release), remote unit (i.e., UE) Internet Protocol ("IP") address allocation and management, DL data notification, and traffic steering configuration of the UPF 141 for proper traffic routing.

The AF 144 is responsible for application influence on traffic routing and/or interacting with policy framework for policy control. In some embodiments, the AF 144 establishes the quality of service ("QoS") for specific applications residing on the network and/or services provided by the network. In certain embodiments, the AF 144 exposes services to end users, such as the remote unit 105.

The NWDAF 145 is responsible for collecting data from other network functions of the mobile core network 140 and providing analytics services, e.g., to support network automation, closed-loop operations, self-healing, experience improvement, and/or reporting. The NWDAF 145 may interface with various network functions to collect events that could be of interest for analysis.

The NRF 146 is responsible for providing Network Function ("NF") service registration and discovery, enabling NFs to identify appropriate services in one another and communicate with each other over Application Programming Interfaces ("APIs").

The DRF 147 is responsible for storing network-related historical data produced by one or more producer NFs in the mobile core network 140 and used (i.e., consumed) by one or more consumer NFs in the mobile core network 140.

The DCCF 148 coordinates collection of data from one or more NF(s) based on data collection requests from one or more Consumer NF(s).

The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like.

In various embodiments, the mobile core network 140 may also include additional NFs, such as an Authentication Server Function ("AUSF") (e.g., an authentication server and/or authentication proxy, thereby allowing the AMF 142 to authenticate a remote unit 105), a Policy Control Function ("PCF") (e.g., responsible for unified policy framework, providing policy rules to CP functions, access subscription information for policy decisions in UDR), a Network Exposure Function ("NEF") (e.g., which is responsible for making network data and resources easily accessible to customers and network partners), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. A "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 143 and UPF 141. In some embodiments, the different network slices may share some common network functions, such as the AMF 142. The different network slices are not shown in FIG. 1 for ease of illustration, but their support is assumed.

The wireless communication system 100 includes an operations, administration, and management ("OAM") platform 160. The Operations, Administration and Maintenance ("OAM") platform 160 is involved with the operating, administering, managing, and maintaining of the system 100. "Operations" encompass automatic monitoring of environment, detecting and determining faults and alerting admins. "Administration" involves collecting performance stats, accounting data for the purpose of billing, capacity planning using Usage data and maintaining system reliability. Administration can also involve maintaining the service databases which are used to determine periodic billing. "Maintenance" involves upgrades, fixes, new feature enablement, backup and restore and monitoring the media health. In certain embodiments, the OAM platform 160 may also be involved with provisioning, i.e., the setting up of the user accounts, devices and services. Note that an OAM platform 160 may receive parameters and/or configurations from a Business Support System ("BSS") and/or an Operations Support System ("OSS").

The management services for a mobile communication network (with or without network slicing) may be produced by any entity. For example, it can be a Network Functions ("NF"), or network management functions. The entity may provide (i.e., produce) such management services as, for example, the performance management services, configuration management services and fault supervision services. The management services can be consumed by another entity, which may in turn produce (i.e., expose) the service to other entities.

While FIG. 1 depicts components of a 5G RAN and a 5G core network, the described embodiments for efficient data collection from an OAM apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 142 may be mapped to an MME, the SMF 143 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "gNB" is used for the base station/base unit, but it is replaceable by any other radio access node, e.g., RAN node, ng-eNB, eNB, Base Station ("BS"), Access Point ("AP"), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems for efficient data collection from an OAM.

FIG. 2 depicts an exemplary procedure 200 for data collection via the DCCF, according to embodiments of the disclosure. The procedure 200 involves a consumer NF 205 (e.g., a NWDAF), a DCCF 210, an NRF 215, and a plurality of data producer NFs (depicted here as the AMF 142, the SMF 143, and the AF 144). Note here that the consumer NF 205 may be one embodiment of the NWDAF 145, the DCCF 210 may be one embodiment of the DCCF 148, and the DRF 225 may be an embodiment of the DRF 147. The procedure 200 to collect data via the DCCF 210 includes the following:

At Step 1, the consumer NF 205 requests data from the DCCF 210, e.g., by invoking an Ndccf service operation to the DCCF 210. In the request, the consumer NF 205 includes the Event ID for data collection. The Event IDs are summarized in 3GPP Technical Specification ("TS") 23.502 clause 4.15 that includes Event ID supported by each NF (e.g., AMF 142, SMF 143, AF 144, etc.).

At Step 2, the DCCF 210 determines the data producer NF type (i.e., AMF, SMF, AF) from the Event ID(s) requested by the consumer NF 205, as there are specific Event ID supported by each NF (e.g., AMF 142, SMF 143, AF 144, etc.).

At Step 3, the DCCF 210 determines the NF instance that has the required data from the NRF 215.

At Step 4, the DCCF 210 subscribes to be notified of the Events from each NF type, e.g., using the Nnf_Event_Exposure subscription.

As discussed above, data collection from OAM requires specific services supported by OAM platforms, where Event ID(s) are not supported. Thus, where the consumer NF 205 determines that data is required from an OAM entity 220, the DCCF 210 may map the consumer NF 205's request to an OAM-specific service procedure to request data from the OAM entity 220, as described in greater detail below.

In some embodiments, a consumer NF 205 may make a direct request to the OAM entity 220 for data collection. In some embodiments, a consumer NF 205 may make a direct request to the NRF 215 to identify a DRF 225 having requested data. In such embodiments, the consumer NF 205 may then make a direct request to the identified DRF 225 for data collection.

According to embodiments of a first solution, data collection is facilitated via a data collection function and data collected from an OAM may be stored in a DRF in the PLMN. In some implementations of the first solution, consumer NFs may request data directly from the OAM upon determining that data is required from the OAM.

In some embodiments, when a data collection request from a consumer NF is sent to the OAM, the consumer NF may include in the request an indication that the required data is to be stored in a DRF in case a second consumer NF requires the same information. Such data is known as "historical" data. How the consumer NF decides that the data must be available as historical data may be up to NF implementation. The OAM may also be configured by a network operator to store data at a DRF based on network operator expectation that such data will be required by multiple consumer NFs.

The OAM stores the data at a DRF and updates the NRF with information on the data stored at the DRF. The information includes one or more of: a Data Type (e.g., performance data file type, or performance data streaming), Data Type Information (e.g., RSRP, RSRQ, CQI, throughput, handover rate), a Measurement Period of the Data, a Target of Reporting (e.g., a particular UE, a particular group of UEs, or any UE), and/or a Data Producer Type (information identifying the data producer, i.e., OAM). Note that the Data Type Information may include data types as defined in 3GPP TS 28.532 and 3GPP TS 28.550 based on the data requested by a consumer. When a second consumer NF requires the same data, the NF queries the NRF to identify if there is a DRF that contains the required data. If a DRF is identified the NF requests the data directly from the DRF or via the DCCF.

Figure 3:
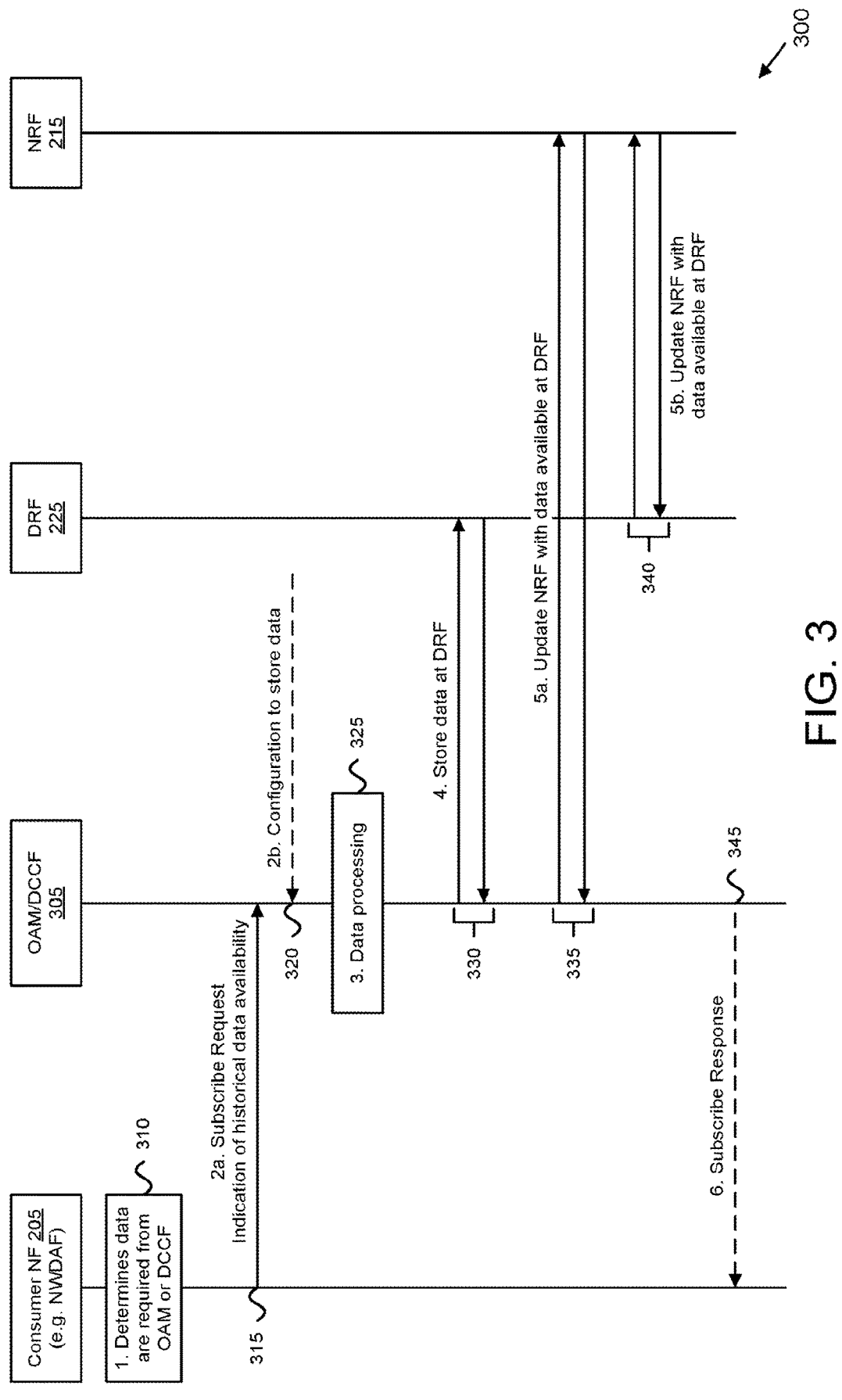
FIG. 3 is a diagram illustrating one embodiment of procedure for the OAM to store data at the DRF.

FIG. 3 depicts an exemplary procedure 300 for an OAM to store data at a DRF, according to embodiments of the first solution. The procedure 300 involves the consumer NF 205 (e.g., NWDAF), an OAM entity and/or DCCF (depicted as combined entity "OAM/DCCF" 305), a DRF 225, and an NRF 215. The procedure to store data at the DRF 225 includes the following steps:

At Step 1, the Consumer NF 205 determines that data is required from the OAM plane, e.g., from the OAM/DCCF 305 (see block 310). In one embodiment, the Consumer NF 205 may check with an NRF 215 to determine whether the required data is already available at a DRF, as described below with reference to FIG. 4. In the depicted embodiments, it is assumed that the required data is not already available at the DRF 225, thus the Consumer NF 205 determines to request the data from the OAM/DCCF 305.

At Step 2a, the Consumer NF 205 may locate an OAM node (e.g., the OAM entity 220) and request the required data. Alternatively, the Consumer NF 205 requests the OAM data from a DCCF (e.g., the DCCF 210). In certain embodiments, the OAM entity 220 may support a data collection coordination function. In some embodiments, the Consumer NF 205 requests the data using the procedures described in 3GPP TS 28.532 and 3GPP TS 28.550.

In the depicted embodiment, the Consumer NF 205 sends a subscribe request message to the OAM/DCCF 305 (see messaging 315). As described above, the Consumer NF 205 may include in the request an indication that the required data is to be stored in a DRF 225, i.e., as historical data.

At optional Step 2b, a network operator may also configure the OAM/DCCF 305 to store data collection at a DRF 225 (see messaging 320). Here, the configuration may be OAM-vendor specific.

At Step 3, the OAM/DCCF 305 processes the required data (see block 325).

At Step 4, the OAM/DCCF 305 stores the data at the DRF 225 (see messaging 330). In some embodiments, the information provided to the DRF 225 may include one or more of: a Data Type (i.e., performance data file type or performance data streaming type), a data type information (i.e., a specific category of the Data Type, e.g., RSRP), a measurement period of the data, a target of reporting (e.g., UE, group of UE or any UE), and/or Data Producer Type (i.e., information identifying the data producer, e.g., OAM).

At Step 5, the NRF 215 is updated with the information stored at the DRF 225, e.g., either by the OAM/DCCF 305 (Option A) or by the DRF 225 (Option B).

Step 5a depicts a first embodiment where the OAM/DCCF 305 updates the NRF 215 with the information stored at the DRF 225 (see messaging 335). Note that the information stored at the DRF 225 may include one or more of: Data Type, Data Type Information, Measurement Period of the data, Target of reporting, and/or Data Producer Type.

Step 5b depicts an alternative embodiment where the DRF 225 may update the NRF 215 with such data (see messaging 340). Again, the information stored at the DRF 225 may include one or more of: Data Type, Data Type Information, Measurement Period of the data, Target of reporting, and/or Data Producer Type.

At Step 6, the OAM/DCCF 305 may provide the data directly to the Consumer NF 205 (see messaging 345). Alternatively, the OAM/DCCF 305 may provide the DRF address that the data is available so that the Consumer NF 205 may go fetch the information itself from the DRF 225.

Figure 4:
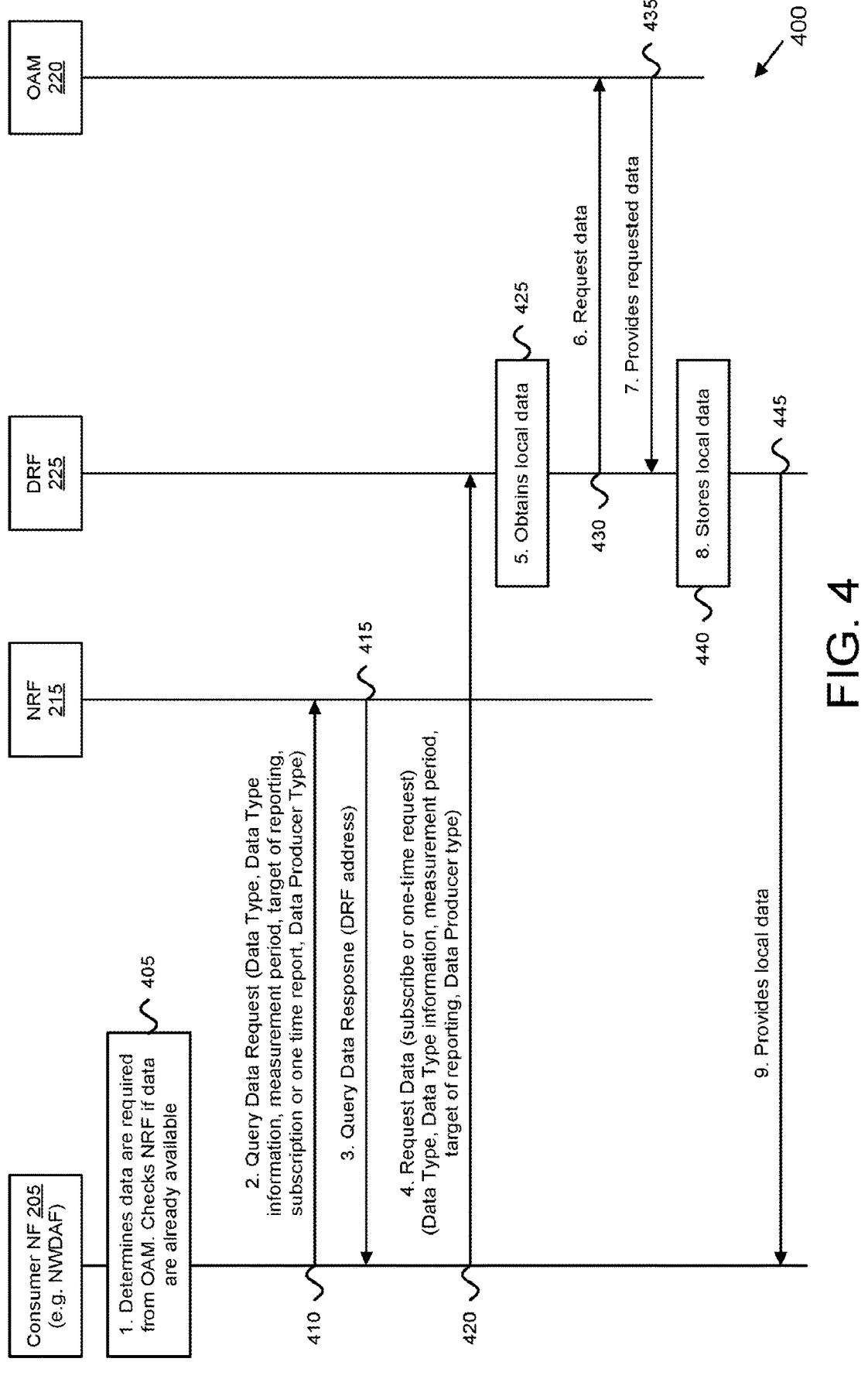
FIG. 4 is a diagram illustrating one embodiment of procedure for a Consumer NF determining whether data available at a DRF.

FIG. 4 depicts an exemplary procedure 400 for determining, by a Consumer NF, whether data is available at a DRF, according to embodiments of the first solution. The procedure 400 involves the Consumer NF 205, the NRF 215, the DRF 225, and the OAM entity 220. The procedure for the Consumer NF 205 to collect data directly from the DRF 225 includes the following steps:

At Step 1, the Consumer NF 205 requires data that are available at an OAM plane. The Consumer NF 205 determines to check with an NRF 215 to determine whether the required data is already available at a DRF (see block 405).

At Step 2, the Consumer NF 205 queries the NRF 215 with the DRF address that contains the required information (see messaging 410). The Consumer NF 205 includes in the request the data required by including one or more of: a Data Type (i.e., performance data file type or performance data streaming type), a data type information (i.e., a specific category of the Data Type, e.g., RSRP), a measurement period of the data, a target of reporting (e.g., UE, group of UE or any UE), a Data Producer Type (i.e., information identifying the data producer, e.g., OAM), and/or an indication of whether the information is required for one time or is to be provided at regular intervals (i.e., a subscription request).

At Step 3, the NRF 215 checks its internal database and provides a response to with the DRF address (e.g., DRF instance ID and/or DRF IP address) that contains the data, if available (see messaging 415).

At Step 4, the Consumer NF 205 requests the data from the DRF 225 (see messaging 420). Here, the request includes one or more of: a data type (e.g., performance data), a data type information (e.g., RSRP), a measurement period of the data, a target of reporting (e.g., a specific UE, a specific group of UEs, or any UE), and whether the information is required for one time or provided at regular intervals (i.e., a subscription request).

At Step 5, the DRF 225 obtains the data (see block 425). If data is not already locally available at the DRF 225, then the DRF 225 requests/retrieves the required data from the OAM entity 220, as shown in optional steps 6 to 8.

At Step 6, the DRF 225 interfaces with the OAM entity 220 to fetch the requested data, e.g., using procedures defined in 3GPP TS 28.532 and/or TS 28.550 (see messaging 430).

At Step 7, the OAM entity 220 provides the requested data (see messaging 435).

At Step 8, the DRF 225 stores the data in the database (see block 440).

At Step 9, the DRF 225 provides the local data to the consumer NF 205 in the response of the Query Data request (see messaging 445).

According to another embodiment of the first solution, a Consumer NF 205 that requires data from the OAM entity 220 may send a request to collect the data to a DCCF 210, e.g., by invoking an Ndccf service operation. In the Ndccf service operation request, the Consumer NF 205 may include one or more of the following information:

Data Type: The type of data required to collect. In case data are required to be retrieved from an OAM the Data Type field includes: Performance Data File Type, Performance Data Streaming, Trace Data, or Analytics data.

Data Type Information: The data required based on the data type request, e.g., as defined in 3GPP TS 28.532 and 3GPP TS 28.550.

The measurement period of the data.

Target of reporting (e.g., a specific UE, a specific group of UEs, or any UE).

Data Producer Type (i.e., OAM).

Based on the service operation request, the DCCF 210 determines whether the required data is available at a DRF, such as the DRF 225. If the required data is not available at the DRF, then the DCCF 210 requests the data from an OAM entity 220, e.g., using the procedure and APIs defined in 3GPP TS 28.532 and/or 3GPP TS 28.550. The DCCF 210 maps the information in the Ndccf service operation request (e.g., Data Type, Data Type Information, Measurement period of the data, and/or Target of reporting) to the OAM entity 220, e.g., based on the APIs defined in 3GPP TS 28.532 and/or 3GPP TS 28.550. When the OAM entity 220 reports the data, the DCCF 210 may store the data at the DRF 225, e.g., if the first request indicates that the data should be available as historical data in case a second consumer NF requires the same information.

Figure 5:
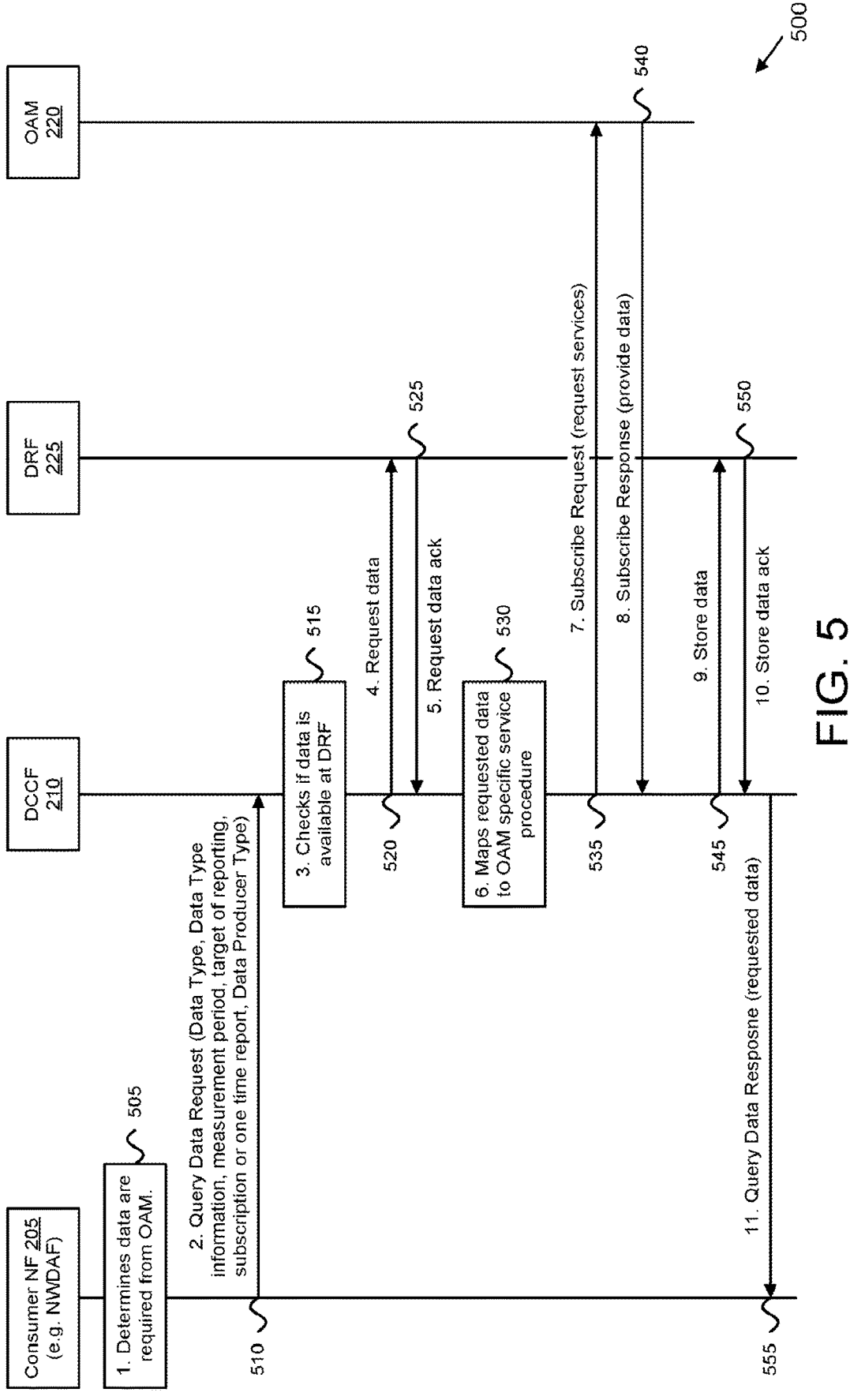
FIG. 5 is a diagram illustrating one embodiment of procedure for a Consumer NF to request OAM data via DCCF.

FIG. 5 depicts an exemplary procedure 500 for a Consumer NF to request OAM data via DCCF, according to embodiments of the first solution. The procedure 500 involves a Consumer NF 205, a DCCF 210, a DRF 225, and an OAM entity 220. The procedure for the Consumer NF 205 to request OAM data via the DCCF 210 includes the following steps:

At Step 1, the Consumer NF 205 determines that data is required that is available from the OAM plane (see block 505).

At Step 2, the Consumer NF 205 sends a request to the DCCF 210 for data available from the OAM plane (see messaging 510). In the depicted embodiment, the Consumer NF 205 sends a query data request that includes information to identify the required data. For example, the Consumer NF 205 may include in the request one or more of the following information: a Data Type (e.g., performance data streaming, or performance data file type), a Data Type Information (e.g., RSRP), the measurement period of the data and target of reporting (UE, group of UE or any UE) and Data Producer Type (i.e., OAM) and whether the information is required for one time or provided at regular intervals (subscription request). In one embodiment the Data Producer Type may also include the address of the OAM node (e.g., OAM entity 220).

At Step 3, the DCCF 210 checks whether data is available at the DRF 225 (see block 515). In one embodiment, the DCCF 210 may also check with the NRF 215 to identify the address of the DRF 225 containing the data.

At Step 4, the DCCF 210 sends a request to the DRF 225 with the data information provided in Step 2 (see messaging 520).

At Step 5, the DRF 225 responds whether the required data is available (see messaging 525).

At Step 6, if the required data is not available at the DRF 225, the DCCF 210 determines, i.e., based on the Data Producer Type, that the required data must be collected by an OAM, e.g., OAM entity 220 (see block 530). The DCCF 210 maps the parameters provided in Step 2 into an OAM-specific service procedure to request data from the OAM entity 220.

At Step 7, the DCCF 210 locates an OAM entity 220 and requests the required data, e.g., using the procedures described in 3GPP TS 28.532 and/or 3GPP TS 28.550 (see messaging 535).

At Step 8, the OAM entity 220 reports the data to the DCCF 210, e.g., using the procedures described in 3GPP TS 28.532 and/or 3GPP TS 28.550 (see messaging 540).

At Step 9, if the required data was not available at the DRF 225, then the DCCF 210 may store the data to the DRF 225, e.g., using an Ndrf service operation (see messaging 545).

At Step 10, the DRF 225 acknowledges the data storage operation (see messaging 550).

At Step 11, the DCCF 210 provides the data requested to the Consumer NF 205 in the response of the Query request (see messaging 555).

According to embodiments of a second solution, data is collected to a DRF for OAM data via the DCCF. In one embodiment of the second solution, a Consumer NF determines that data are required at an OAM. The Consumer NF subscribes to an OAM to obtain the data required, e.g., using the procedure described in 3GPP TS 28.532 and 3GPP TS 28.550.

The OAM then begins to process the data. Once the data are available the OAM creates a file containing the data requested and stores them in a local database. The OAM notifies the Consumer NF that the data is available. The OAM includes in the response a fileInfoList parameter, as shown in Table 1 below, that includes information about the location of the file and the type of data in the file (i.e., Performance, Trace, Analytics or Proprietary) to obtain the data (note that parameter fileInfoList may be optional). This is shown in Table 1 below.

TABLE 1

| Notification provided by OAM | | |
|---|---|---|
| notificationType | "notifyFileReady" | The type of notification, and it shall be assigned to "notifyFileReady" for this notification. |
| fileInfoList | List of struct < fileLocation, fileSize fileReadyTime fileExpirationTime fileCompression, fileFormat, fileType, >. Each element is defined as following: fileLocation: It identifies the location of the file. The location may be a directory path or a Uniform Resource Locator ("URL"). For example: "\\202.112.101.1\D:\user\Files\<xxx>" or "ftp://nms.telecom_org.com/datastore/<xxx>, where <xxx> is the filename. fileSize: It identifies the size of the file. Its value is positive Integer (the unit is byte). fileReadyTime: It identifies the date and time when the file was last closed and made available in the management service producer and the file content will not be changed. fileExpirationTime: It identifies the date and time beyond which the file may be deleted. It shall not be empty and shall be later than fileReadyTime. fileCompression: It identifies the name of the compression algorithm used for the file. An empty fileCompression means that there is no compression on the file. Choice of compression algorithm is vendor-specific but is encouraged to use industrial standard algorithm such as GZIP. fileFormat: It identifies the encoding technique used by the file. Its value should indicate the version of the file format specification plus to indicate if "ASN1" or "XML-schema" is used. fileType: It identifies the type of the management data stored in the file. Following are the allowed values: For performance data (including measurement data and Key Performance Indicator ("KPI")) files, the value is assigned to "PERFORMANCE". For trace data files, the value is assigned to "TRACE". For analytic data files, the value is assigned to "ANALYTICS". For proprietary data files, the value is assigned to "PROPRIETARY". | It specifies the information of each available file. |

The Consumer NF then request the DCCF, e.g., using an Ndccf service operation, to collect the data from the specified location and optionally stores the data at the DRF. The DCCF may include one or more of the following information in the request:

The location of the file

The type of data (e.g., Performance, Analytics, Trace, etc.)

The measurement period of the data

The Target of reporting (e.g., a specific UE, a Group of UEs, or any UE)

The DCCF then collects the data from the OAM database and stores them at the DRF. For any subsequent request from a Consumer NF that requires the same data the DCCF provides the data available at the DRF.

Figure 6:
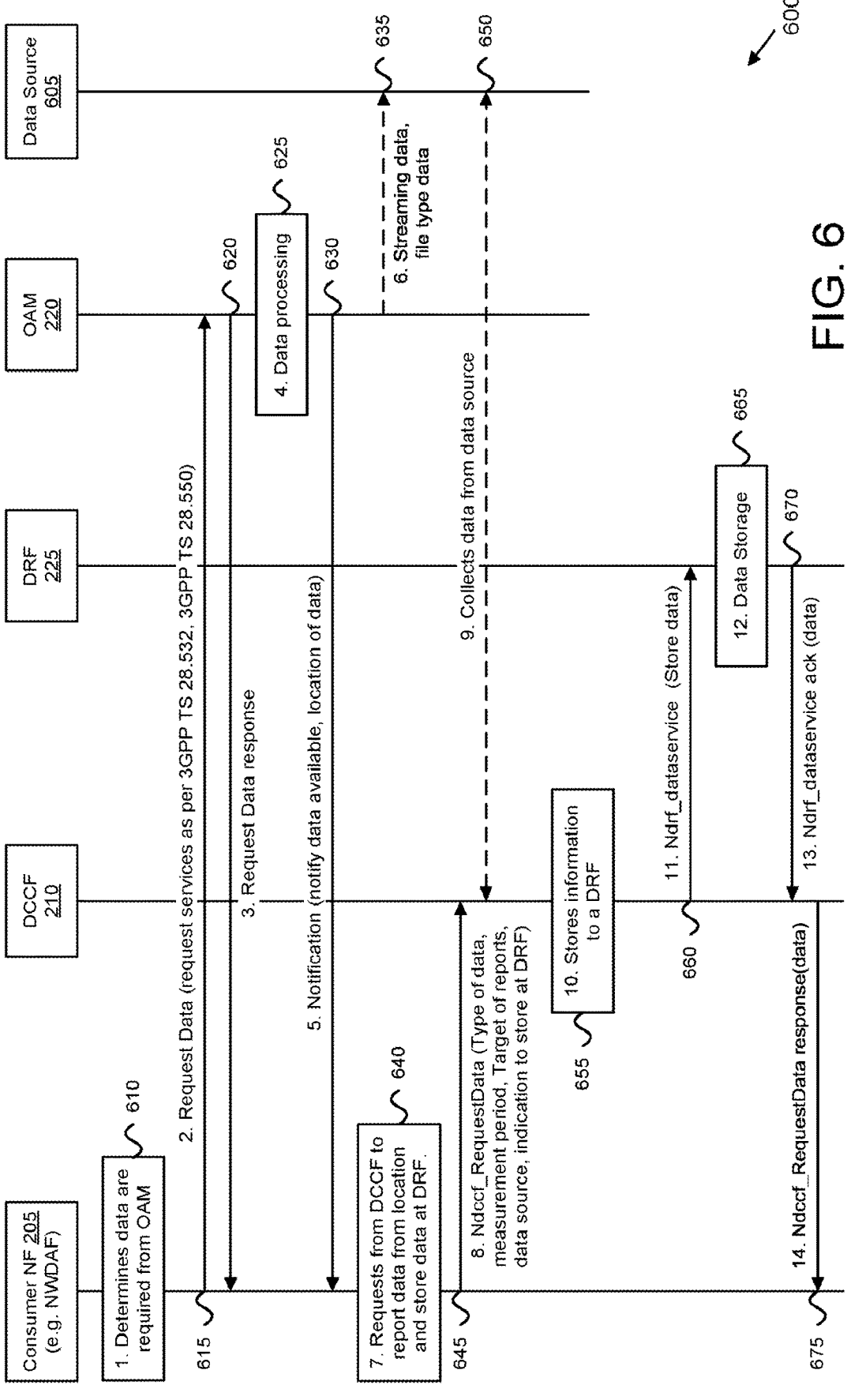
FIG. 6 is a diagram illustrating one embodiment of procedure for a DCCF to collect data from OAM.

FIG. 6 depicts an exemplary procedure 600 for a DCCF to collect data from OAM, according to embodiments of the second solution. The procedure 600 involves a Consumer NF 205, a DCCF 210, a DRF 225, an OAM entity 220, and a data source 605. The procedure 600 for the DCCF 210 to collect data from the OAM entity 220 includes the following steps:

At Step 1, a Consumer NF 205 determines that is requires data from the OAM plane (see block 610). As an example, the Consumer NF 205 may be an embodiment of the NWDAF 145 requiring data for analytics generation. As another example, the Consumer NF 205 may be an embodiment of a DCCF requesting data from a different DCCF.

At Step 2, the Consumer NF 205 subscribes with the OAM entity 220 to obtain the required data, e.g., according to procedures described in 3GPP TS 28.532 and/or TS 28.550 (see messaging 615). If the request is for streaming data, then the Consumer NF 205 provides a target address for sending the streaming data (e.g., the address of the Data Source 605). An example of this process is when the Consumer NF 205 requests a "Create MOI", as described in 3GPP TS 28.532 and TS 28.550, where "MOI" refers to a managed object instance.

At Step 3, the OAM entity 220 sends a response that acknowledges the request (see messaging 620).

At Step 4, the OAM entity 220 processes the required data (see block 625).

At Step 5, for file type data, once the required data is available, the OAM entity 220 notifies the Consumer NF 205 that the required data is available and the location of the data (i.e., the address of the Data Source 605), e.g., as described in 3GPP TS 28.532 and 28.550 (see messaging 630).

At optional Step 6, the OAM entity 220 provides streaming data or file type data to a Data Source 605 (see messaging 635).

At Step 7, the Consumer NF 205 discovers the DCCF 210 and requests the DCCF 210 to collect and store the data (see block 640).

At Step 8, the Consumer NF 205 sends a request to a DCCF 210 via an Ndccf service operation request (see messaging 645). In the depicted embodiment, the request includes information of the required data, e.g., one or more of: the location of the data (i.e., data source address), the type of data, the measurement period of the data, and/or the Target of reporting (e.g., a specific UE, a Group of UEs, or any UE).

At optional Step 9, the DCCF 210 collects the data from the location specified (see messaging 650).

At Step 10, the DCCF 210 stores the type of data collected (see block 655). In an alternative embodiment, the DCCF 210 may update the NRF 215 with the type of data collected and available at a DRF 225.

At Step 11, the DCCF 210 initiates an Ndrf service to store the data at the DRF 225 (see messaging 660).

At Step 12, the DRF 225 locally stores the data (see block 665).

At Step 13, the DRF 225 acknowledges the request (see messaging 670).

At Step 14, the DCCF 210 provides the requested data to the Consumer NF 205 in the Ndccf service operation response (see messaging 675).

Figure 7:
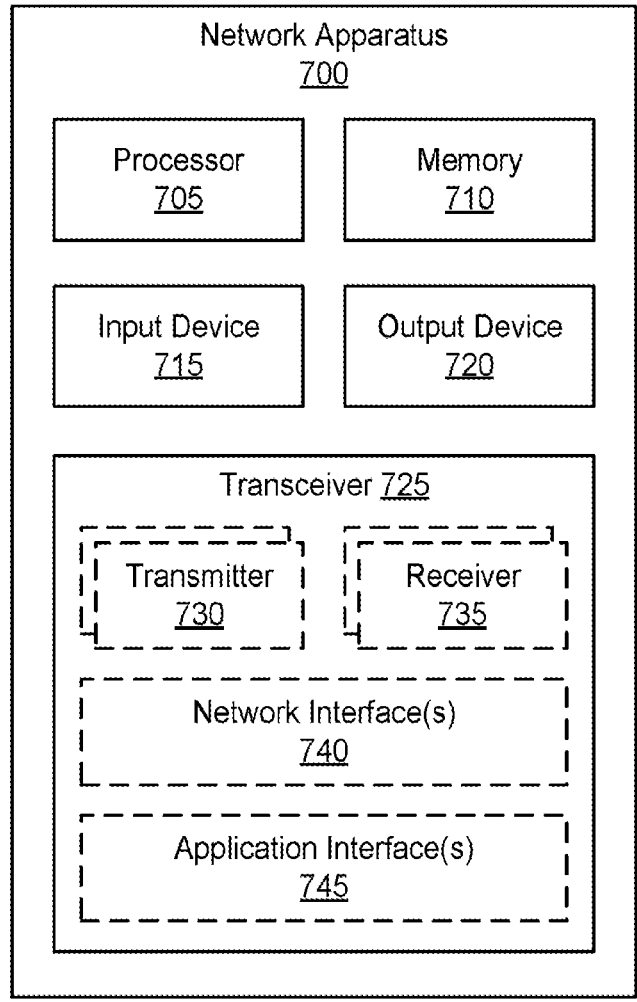
FIG. 7 is a block diagram illustrating one embodiment of a network apparatus that may be used for efficient data collection from an OAM.

FIG. 7 depicts a network apparatus 700 that may be used for efficient data collection from an OAM, according to embodiments of the disclosure. In some embodiments, the network apparatus 700 may be one embodiment of an OAM system and its supporting hardware, such as the OAM platform 160 and/or the OAM entity 220, as described above. In other embodiments, the network apparatus 700 may be one embodiment of a DCCF and its supporting hardware, such as the DCCF 148 and/or the DCCF 210, as described above. Furthermore, the network apparatus 700 may include a processor 705, a memory 710, an input device 715, an output device 720, and a transceiver 725.

In some embodiments, the input device 715 and the output device 720 are combined into a single device, such as a touchscreen. In certain embodiments, the network apparatus 700 may not include any input device 715 and/or output device 720. In various embodiments, the network apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. Here, the transceiver 725 communicates with one or more remote units 105. Additionally, the transceiver 725 may support at least one network interface 740 and/or application interface 745. The application interface(s) 745 may support one or more APIs. The network interface(s) 740 may support 3GPP reference points, such as Uu, N1, N2 and N3. Other network interfaces 740 may be supported, as understood by one of ordinary skill in the art.

When implementing an OAM, the network interface(s) 740 may include an interface for communicating with a Consumer NF, a DRF, a NRF, a DCCF, and/or data source, e.g., using a service operation, as described above. When implementing a DCCF, the network interface(s) 740 may include an interface for communicating with a Consumer NF, a DRF, and/or an OAM, e.g., using a service operation, as described above.

The processor 705, in one embodiment, may include any known controller capable of executing computer-readable instructions and/or capable of performing logical operations. For example, the processor 705 may be a microcontroller, a microprocessor, a Central Processing Unit ("CPU"), a Graphics Processing Unit ("GPU"), an auxiliary processing unit, a Field Programmable Gate Array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In some embodiments, the network apparatus 700 is a RAN node (e.g., gNB) that communicates with one or more UEs, as described herein. In such embodiments, the processor 705 controls the network apparatus 700 to perform the above described RAN behaviors. When operating as a RAN node, the processor 705 may include an application processor (also known as "main processor") which manages application-domain and operating system ("OS") functions and a baseband processor (also known as "baseband radio processor") which manages radio functions.

In various embodiments, the network apparatus 700 comprises an OAM entity that communicates with one or more entities in a mobile communication network (e.g., via a transceiver 725 and/or network interface 740), as described herein. In such embodiments, the processor 705 controls the network apparatus 700 to perform the above described OAM behaviors.

In some embodiments, the transceiver 725 (i.e., implementing a network interface 740) receives a first request, from a first network function (e.g., from a Consumer NF), to provide data for at least one data type information. Here, the first request includes an indication that the data is to be available as historical data. The processor 705 processes the data required according to the first request and sends a second request to a DRF, where the second request includes the data required and an indication that the data is to be available as historical data. Via the transceiver 725, the processor 705 provides the data required to the first network function.

In some embodiments, providing the data required to the first network function includes sending an address of the DRF where the data required can be retrieved. In some embodiments, the processor 705 further sends a third request to an NRF, where the third request includes information of the data available at the DRF. In certain embodiments, the information of the data available at the DRF includes one or more of: A) Data Type, B) Data Type Information, C) Measurement Period of the data, D) Target of reporting, and/or E) Data Producer Type.

In some embodiments, the first request further indicates at least one property of the requested data, said at least one property being one or more of: A) Data Type, B) Data Type Information, C) Measurement Period of the data, D) Target of reporting, and/or E) Data Producer Type. In some embodiments, the second request further indicates at least one property of the data required, said at least one property being one or more of: A) Data Type, B) Data Type Information, C) Measurement Period of the data, D) Target of reporting, and/or E) Data Producer Type.

In various embodiments, the network apparatus 700 comprises a DCCF that communicates with one or more entities in a mobile communication network (e.g., via a transceiver 725 and/or network interface 740), as described herein. In such embodiments, the processor 705 controls the network apparatus 700 to perform the above described DCCF behaviors.

In some embodiments, the transceiver 725 (i.e., implementing a network interface) that receives, from a first network function (e.g., from a Consumer NF), a first request to provide data. Here, the first request includes first information to identify the data requested.

The processor 705 determines whether the data requested is available at a DRF, where the first information indicates that the data requested is to be retrieved from an OAM platform. Via the transceiver 725, the processor 705 retrieves the data requested from the DRF when the data requested is available at the DRF and sends a second request to the OAM platform to retrieve the data when the data requested are not available at the DRF, where the second request includes a request for data based on the first information.

In various embodiments, the processor 705 further provides the data required to the first network function. In some embodiments, determining whether the data requested is available at the DRF includes sending a query to a NRF to identify an address of the DRF containing the data requested.

In some embodiments, the first information to identify the data includes one or more of the following fields: A) a Data Type field that includes the type of data required to collect; B) a Data Type Information field that includes metrics to be provided according to the data type field; C) information identifying the measurement period of the data; D) information identifying the target devices for reporting measurement data; and/or E) a Data Producer Type which identifies the OAM to retrieve the data.

In certain embodiments, the Data Producer Type field includes an address of the OAM platform. In certain embodiments, the first information further indicates whether the information is required for one time or provided at regular intervals (i.e., subscription request).

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to efficient data collection from an OAM and/or mobile operation. For example, the memory 710 may store parameters, configurations, resource assignments, policies, and the like, as described above. In certain embodiments, the memory 710 also stores program code and related data, such as an operating system or other controller algorithms operating on the apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, a liquid-crystal display ("LCD"), an Light-Emitting Diode ("LED") display, an Organic LED ("OLED") display, a projector, or similar display device capable of outputting images, text, or the like to a user. As another, non-limiting, example, the output device 720 may include a wearable display separate from, but communicatively coupled to, the rest of the network apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 includes at least transmitter 730 and at least one receiver 735. One or more transmitters 730 may be used to communicate with network functions in the Public Land Mobile Network ("PLMN") and/or RAN, as described herein. Similarly, one or more receivers 735 may be used to communicate with the network functions. Although only one transmitter 730 and one receiver 735 are illustrated, the network apparatus 700 may have any suitable number of transmitters 730 and receivers 735. Further, the transmitter(s) 730 and the receiver(s) 735 may be any suitable type of transmitters and receivers.

FIG. 8 depicts one embodiment of a method 800 for handling a data collection request, according to embodiments of the disclosure. In various embodiments, the method 800 is performed by a data management device, such as the DCCF 148, the OAM 160, the DCCF 210, the OAM entity 220, and/or the network apparatus 700, described above as described above. In some embodiments, the method 800 is performed by a processor, such as a microcontroller, a microprocessor, a CPU, a GPU, an auxiliary processing unit, a FPGA, or the like.

The method 800 begins and receives 805 a first request to provide data from a first network function (e.g., Consumer NF), where the first request includes an indication that the data is to be available as historical data. The method 800 includes processing 810 the data required according to the first request. The method 800 includes sending 815 a second request to a DRF, where the second request includes the data required and an indication that the data is to be available as historical data. The method 800 includes providing 820 the data required to the first network function. The method 800 ends.

Figure 9:
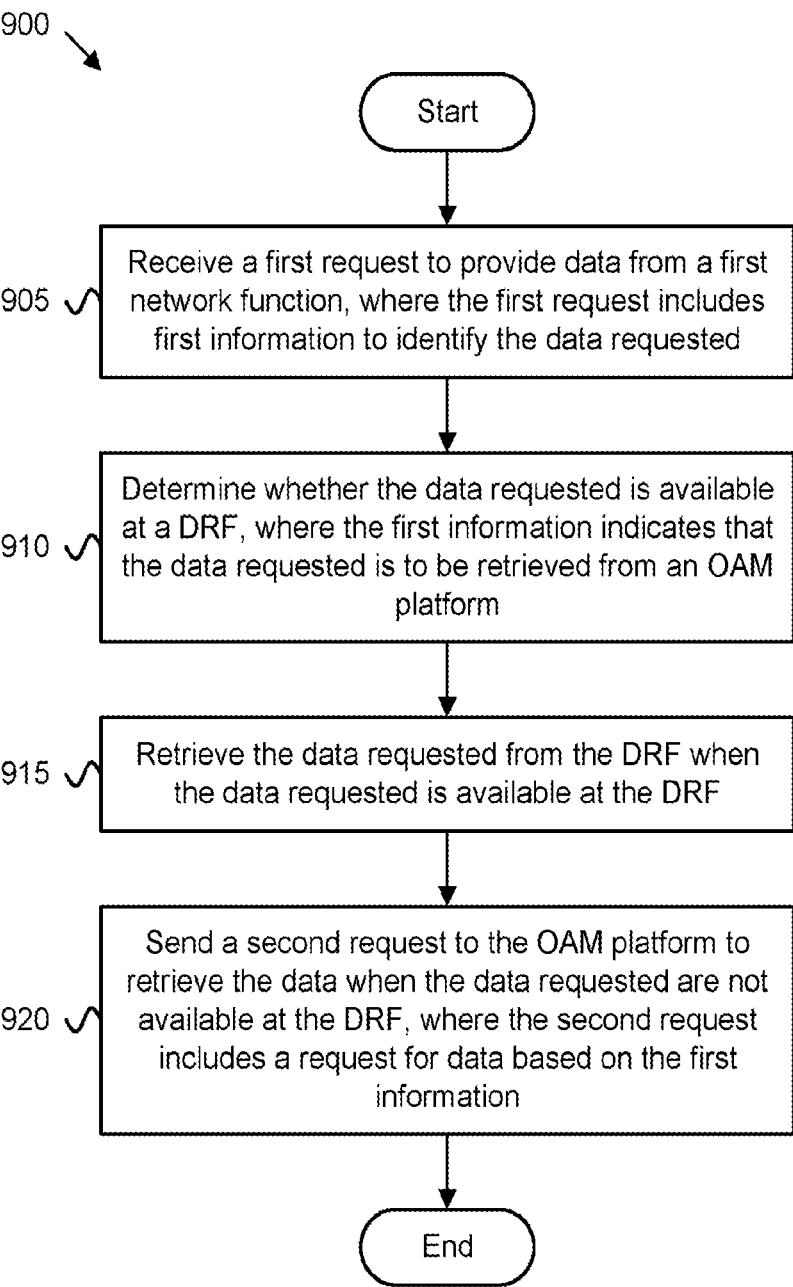
FIG. 9 is a flowchart diagram illustrating one embodiment of a second method for efficient data collection from an OAM.

FIG. 9 depicts one embodiment of a method 900 for coordinating data collection at a network entity, according to embodiments of the disclosure. In various embodiments, the method 900 is performed by a coordinating data collection entity, such as the DCCF 148, the DCCF 210, and/or the network apparatus 700, described above as described above. In some embodiments, the method 900 is performed by a processor, such as a microcontroller, a microprocessor, a CPU, a GPU, an auxiliary processing unit, a FPGA, or the like.

The method 900 begins and receives 905 a first request to provide data from a first network function (e.g., from a Consumer NF), where the first request includes first information to identify the data requested. The method 900 includes determining 910 whether the data requested is available at a DRF, where the first information indicates that the data requested is to be retrieved from an OAM platform. The method 900 includes retrieving 915 the data requested from the DRF when the data requested is available at the DRF. The method 900 includes sending 920 a second request to the OAM platform to retrieve the data when the data requested are not available at the DRF, where the second request includes a request for data based on the first information. The method 900 ends.

Disclosed herein is a first apparatus for handling a data collection request, according to embodiments of the disclosure. The first apparatus may be implemented by a data management device, such as the DCCF 148, the OAM 160, the DCCF 210, the OAM entity 220, and/or the network apparatus 700, described above. The first apparatus includes a processor and a transceiver (i.e., implementing a network interface) that receives, from a first network function (e.g., from a Consumer NF), a first request to provide data for at least one data type information, where the first request includes an indication that the data is to be available as historical data. The processor processes the data required according to the first request and sends a second request to a DRF, where the second request includes the data required and an indication that the data is to be available as historical data. The processor provides the data required to the first network function.

In some embodiments, providing the data required to the first network function includes sending an address of the DRF where the data required can be retrieved. In some embodiments, the processor further sends a third request to an NRF, where the third request includes information of the data available at the DRF. In certain embodiments, the information of the data available at the DRF includes one or more of: A) Data Type, B) Data Type Information, C) Measurement Period of the data, D) Target of reporting, and/or E) Data Producer Type.

In some embodiments, the first request further indicates at least one property of the requested data, said at least one property being one or more of: A) Data Type, B) Data Type Information, C) Measurement Period of the data, D) Target of reporting, and/or E) Data Producer Type. In some embodiments, the second request further indicates at least one property of the data required, said at least one property being one or more of: A) Data Type, B) Data Type Information, C) Measurement Period of the data, D) Target of reporting, and/or E) Data Producer Type.

Disclosed herein is a first method for handling a data collection request, according to embodiments of the disclosure. The first method may be performed by a data management device, such as the DCCF 148, the OAM 160, the DCCF 210, the OAM entity 220, and/or the network apparatus 700, described above. The first method includes receiving a first request to provide data from a first network function (e.g., from a Consumer NF), where the first request includes an indication that the data is to be available as historical data. The first method includes processing the data required according to the first request. The first method includes sending a second request to a DRF, where the second request includes the data required and an indication that the data is to be available as historical data. The first method includes providing the data required to the first network function.

In some embodiments, providing the data required to the first network function includes sending an address of the DRF where the data required can be retrieved. In some embodiments, the first method includes sending a third request to NRF, where the third request includes information of the data available at the DRF. In certain embodiments, the information of the data available at the DRF includes one or more of: A) Data Type, B) Data Type Information, C)

Measurement Period of the data, D) Target of reporting, and/or E) Data Producer Type.

In some embodiments, the first request further indicates at least one property of the requested data, said at least one property being one or more of: A) Data Type, B) Data Type Information, C) Measurement Period of the data, D) Target of reporting, and/or E) Data Producer Type. In some embodiments, the second request further indicates at least one property of the data required, said at least one property being one or more of: A) Data Type, B) Data Type Information, C) Measurement Period of the data, D) Target of reporting, and/or E) Data Producer Type.

Disclosed herein is a second apparatus for coordinating data collection at a network entity, according to embodiments of the disclosure. The second apparatus may be implemented by a coordinating data collection entity, such as the DCCF 148, the DCCF 210, and/or the network apparatus 700, described above. The second apparatus includes a processor and a transceiver (i.e., implementing a network interface) that receives, from a first network function (e.g., from a Consumer NF), a first request to provide data, where the first request includes first information to identify the data requested.

The processor determines whether the data requested is available at a DRF, where the first information indicates that the data requested is to be retrieved from an OAM platform. Via the transceiver, the processor retrieves the data requested from the DRF when the data requested is available at the DRF and sends a second request to the OAM platform to retrieve the data when the data requested are not available at the DRF, where the second request includes a request for data based on the first information.

In various embodiments, the processor further provides the data required to the first network function. In some embodiments, determining whether the data requested is available at the DRF includes sending a query to a NRF to identify an address of the DRF containing the data requested.

In some embodiments, the first information to identify the data includes one or more of the following fields: A) a Data Type field that includes the type of data required to collect; B) a Data Type Information field that includes metrics to be provided according to the data type field; C) information identifying the measurement period of the data; D) information identifying the target devices for reporting measurement data; and/or E) a Data Producer Type which identifies the OAM to retrieve the data.

In certain embodiments, the Data Producer Type field includes an address of the OAM platform. In certain embodiments, the first information further indicates whether the information is required for one time or provided at regular intervals (i.e., subscription request).

Disclosed herein is a second method for coordinating data collection at a network entity, according to embodiments of the disclosure. The second method may be performed by a coordinating data collection entity, such as the DCCF 148, the DCCF 210, and/or the network apparatus 700, described above. The second method includes receiving a first request to provide data from a first network function (e.g., from a Consumer NF), where the first request includes first information to identify the data requested. The second method includes determining whether the data requested is available at a DRF, where the first information indicates that the data requested is to be retrieved from an OAM platform. The second method includes retrieving the data requested from the DRF when the data requested is available at the DRF and sending a second request to the OAM platform to retrieve the data when the data requested are not available at the DRF, where the second request includes a request for data based on the first information.

In various embodiments, the second method includes providing the data required to the first network function. In some embodiments, determining whether the data requested is available at the DRF includes sending a query to a NRF to identify an address of the DRF containing the data requested.

In some embodiments, the first information to identify the data includes one or more of the following fields: A) a Data Type field that includes the type of data required to collect; B) a Data Type Information field that includes metrics to be provided according to the data type field; C) information identifying the measurement period of the data; D) information identifying the target devices for reporting measurement data; and/or E) a Data Producer Type which identifies the OAM to retrieve the data.

In certain embodiments, the Data Producer Type field includes an address of the OAM platform. In certain embodiments, the first information further indicates whether the information is required for one time or provided at regular intervals (i.e., subscription request).

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a network entity, the method comprising:

receiving, from a first network function, a first request to provide data, wherein the first request comprises an indication that the data is to be available as historical data, wherein the first request further indicates properties of the requested data, the properties comprising a data type, a data type information, and a measurement period of the data;

processing the data required according to the first request;

transmitting a second request to a Data Repository Function ("DRF"), wherein the second request comprises the data required, wherein the second request further indicates properties of the requested data, the properties comprising the data type, the data type information, and the measurement period of the data; and providing the data required to the first network function.

2. The method of claim 1, wherein providing the data required to the first network function comprises transmitting an address of the DRF where the data required can be retrieved.

3. The method of claim 1, further comprising transmitting a third request to a Network Function Repository Function ("NRF"), wherein the request includes information of the data available at the DRF.

4. The method of claim 3, wherein the information of the data available at the DRF comprises the data type, the data type information, the measurement period of the data, a target of reporting, and/or a data producer type, or a combination thereof.

5. The method of claim 1, wherein the properties of the data requested in the first request further comprise a target of reporting, a data producer type, or a combination thereof.

6. The method of claim 1, wherein the properties of the data requested in the second request comprise a target of reporting, a data producer type, or a combination thereof.

7. A network entity for wireless communication, comprising:

at least one memory;

at least one processor coupled with the at least one memory and configured to cause the network entity to:

receive, from a first network function, a first request to provide data, wherein the first request comprises an indication that the data is to be available as historical data, wherein the first request further indicates properties of the requested data, the properties comprising a data type, a data type information, and a measurement period of the data;

process the data required according to the first request;

transmit a second request to a Data Repository Function ("DRF"), wherein the second request comprises the data required, wherein the second request further indicates properties of the requested data, the properties comprising the data type, the data type information, and the measurement period of the data; and provide the data required to the first network function.

8. The network entity of claim 7, wherein providing the data required to the first network function comprises transmitting an address of the DRF where the data required can be retrieved.

9. The network entity of claim 7, further comprising transmitting a third request to a Network Function Repository Function ("NRF"), wherein the third request includes information of the data available at the DRF, wherein the information of the data available at the DRF comprises the data type, the data type information, the measurement period of the data, a target of reporting, a data producer type, or a combination thereof.

10. A network entity for wireless communication, comprising:

at least one memory; and at least one processor coupled with the at least one memory and configured to cause the network entity to:

receive, from a first network function, a first request to provide data, wherein the first request includes first information to identify the data requested, wherein the first information to identify the data comprises a data type field that includes a type of data required to collect, a data type information field that includes metrics to be provided according to the data type field, and information identifying a measurement period of the data;

determine whether the data requested is available at a Data Repository Function ("DRF"), wherein the first information indicates that the data requested is to be retrieved from an Operations, Administration and Management ("OAM") platform;

retrieve the data requested from the DRF when the data requested is available at the DRF; and transmit a second request to the OAM platform to retrieve the data when the data requested are not available at the DRF, wherein the second request includes a request for data based on the first information.

11. The network entity of claim 10, wherein the at the least one processor is further configured to cause the network entity to provide the data required to the first network function.

12. The network entity of claim 10, wherein the first information to identify the data further comprises:

information identifying target devices for reporting measurement data, a data producer type field which identifies the OAM to retrieve the data, or a combination thereof.

13. The network entity of claim 12, wherein the data producer type field comprises an address of the OAM platform.

14. The network entity of claim 12, wherein the first information further indicates whether the information is required for one time or provided at regular intervals.

15. The network entity of claim 10, wherein to determine whether the data requested is available at the DRF, the at least one processor is configured to cause the network entity to transmit a query to a Network Function Repository Function ("NRF") to identify an address of the DRF containing the data requested.

16. A method performed by a network entity comprising:

receive, from a first network function, a first request to provide data, wherein the first request includes first information to identify the data requested, wherein the first information to identify the data comprises a data type field that includes a type of data required to collect, a data type information field that includes metrics to be provided according to the data type field, and information identifying a measurement period of the data;

determine whether the data requested is available at a Data Repository Function ("DRF"), wherein the first information indicates that the data requested is to be retrieved from an Operations, Administration and Management ("OAM") platform;

retrieve the data requested from the DRF when the data requested is available at the DRF; and transmit a second request to the OAM platform to retrieve the data when the data requested are not available at the DRF, wherein the second request includes a request for data based on the first information.

17. The method of claim 16, further comprising providing the data required to the first network function.

18. The method of claim 16, wherein the first information to identify the data further comprises information identifying target devices for reporting measurement data, a Data Producer Type which identifies the OAM to retrieve the data, or a combination thereof.

19. The method of claim 18, wherein the first information further indicates whether the information is required for one time or provided at regular intervals.

20. The method of claim 16, wherein determining whether the data requested is available at the DRF comprises transmitting a query to a Network Function Repository Function ("NRF") to identify an address of the DRF containing the data requested.

* * * * *